United States Patent [19]

Failes

[11] 4,247,202
[45] * Jan. 27, 1981

[54] AUTOMATIC COMPUTING COLOR METER

[75] Inventor: Michael Failes, Mississauga, Canada

[73] Assignee: Canadian Instrumentation and Research, Mississauga, Canada

[*] Notice: The portion of the term of this patent subsequent to Aug. 21, 1996, has been disclaimed.

[21] Appl. No.: 51,702

[22] Filed: Jun. 25, 1979

Related U.S. Application Data

[63] Continuation-in-part of Ser. No. 807,435, Jun. 17, 1977, Pat. No. 4,165,180.

[51] Int. Cl.³ .............................. G01J 3/42; G01J 3/50
[52] U.S. Cl. ..................................... 356/310; 250/226; 356/323; 356/405; 364/526
[58] Field of Search ............... 356/310, 319, 323–325, 356/405, 406, 402, 236; 250/226; 364/498, 526

[56] References Cited

U.S. PATENT DOCUMENTS

| | | | |
|---|---|---|---|
| 2,046,958 | 7/1936 | Marvin | 356/319 |
| 3,314,327 | 4/1967 | Killpatrick et al. | 356/405 X |
| 3,874,799 | 4/1975 | Isaacs et al. | 356/236 X |
| 4,093,991 | 6/1978 | Christie, Jr. et al. | 364/498 X |
| 4,165,180 | 8/1979 | Failes | 356/310 |

FOREIGN PATENT DOCUMENTS 914820  1/1963  United Kingdom ..................... 356/405

OTHER PUBLICATIONS

Kok et al., *Applied Optics*, vol. 10, No. 12, Dec. 1971, pp. 2617–2620.

*Primary Examiner*—F. L. Evans
*Attorney, Agent, or Firm*—George H. Riches and Associates

[57] ABSTRACT

A novel apparatus for the measurement of color of a sample which comprises an illumination means to illuminate the sample, an electro-optical sensing head to receive the light from the illuminated sample and to output electronic signals and an electronic processing unit to process the signals. The light source may in the preferred embodiment be the sun or the sample itself and a reference optical path is used for reference which is the same optical path as the optical path from the light from the sample. The tristimulus values X, Y, Z and the chromaticity coordinates x, y of the sample with respect to the CIE standards for luminance and chromaticity values are produced for accurate color measurement.

10 Claims, 27 Drawing Figures

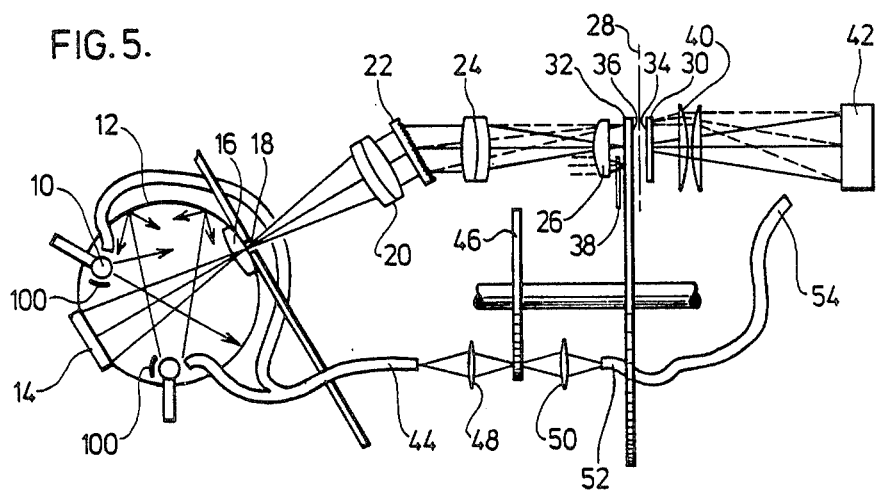
FIG. 5.
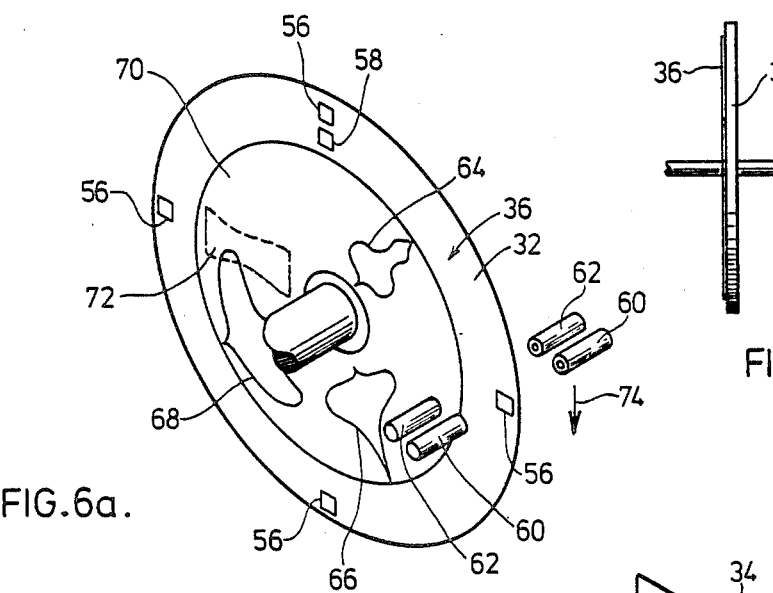
FIG. 6a.
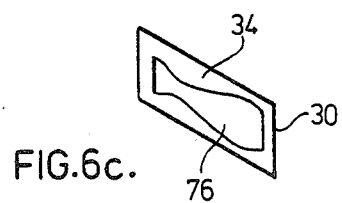
FIG. 6b.
FIG. 6c.
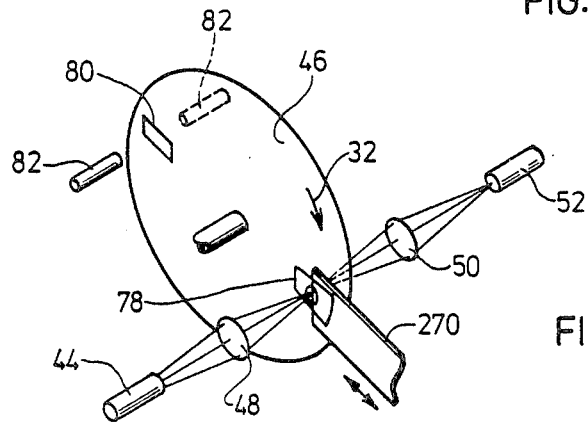
FIG. 6d.

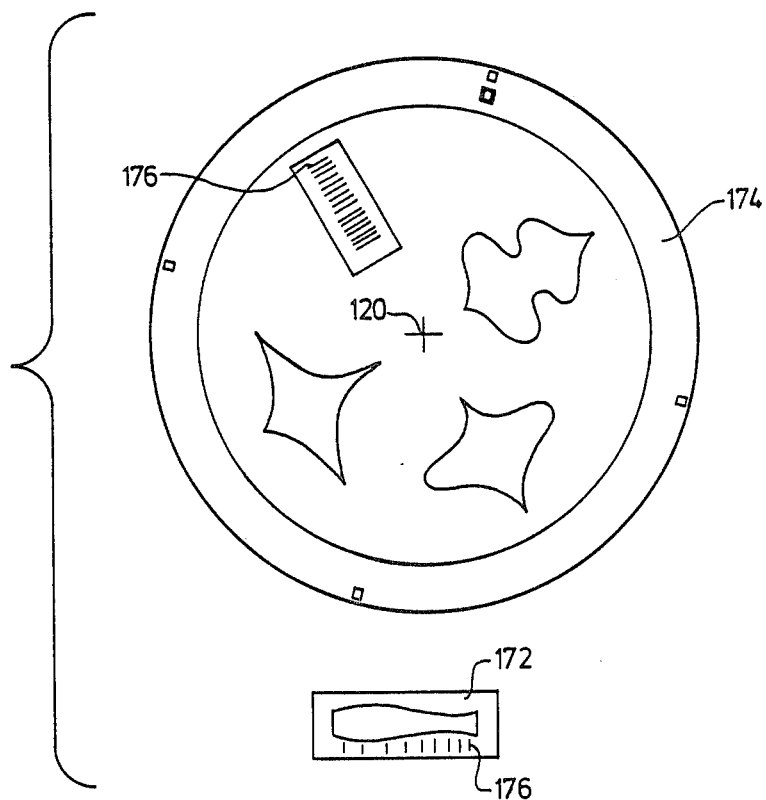

AUTOMATIC COMPUTING COLOR METER

CROSS REFERENCE TO RELATED APPLICATIONS

This is a continuation-in-part application of U.S. application Ser. No. 807,435 filed on June 17, 1977 now U.S. Pat. No. 4,165,180.

BACKGROUND OF THE INVENTION

1. Field of the Invention

This invention relates generally to the field of optics and more particularly to an instrument for the measurement of colour.

2. Description of the Prior Art

Standards for the measurement of colour have been set by the Commissioner International de l'Eclairage (hereinafter referred to as CIE) and are used universally and reference will be made throughout this disclosure to these CIE standards.

Colour perception is dependent upon the characteristics of each observer's eyes and varies from person to person. A luminosity function which represents the "standard" eye has been formulated by the CIE and is defined as the $\bar{y}$ function which peaks in the green part of the spectrum [$\bar{x}$ and $\bar{z}$ are similarly defined functions peaking in the red and blue parts of the spectrum respectively].

As any particular light source has a specific energy distribution and a coloured object has a particular absorption characteristic, the perceived colour of the object is dependent upon both of these factors.

Quantitative specification of colour may be made by three tristimulus values X, Y, Z which are the integrals of the products of the CIE functions, $\bar{x}$, $\bar{y}$, $\bar{z}$ with the radiant energy distribution functions from the object.

Two chromaticity values can be derived from the following relations:

$$x = \frac{X}{X + Y + Z} \quad (I)$$

$$y = \frac{Y}{X + Y + Z} \quad (II)$$

which can be represented on a chromaticity diagram for colour determination.

The measurement of colour has been well documented in the past and many devices have been made to perform this function. The modern devices may be generally divided into two classes:

(a) those using optical transmission filters, and (b) those using spectrophotometric scanning and subsequent digital computing.

The first class of devices has high light throughput but suffers from the inherent disadvantage that an optical transmission filter cannot be made to accurately conform with the standard distribution functions set by the CIE and therefore, is not standardized.

The latter class of devices have a relatively slow response, low light throughput thereby resulting in a poor signal to noise ratio and they require digitisation of a spectral response curve and subsequent digital integration to determine tristimulus values and then the chromaticity coordinate values.

These devices and their theory of operation have been described in "The Science of Colour" published by the Optical Society of America. Reference is also made to "New Spectrophotometric and Tristimulus Mask Colourimeter" by Kok, C.J. and Boshoff, M. C. published in Applied Optics, December 1971, Volume 10, Vol. 12 commencing on page 2617 for a description of an apparatus which may be used both as a spectrophotometer and as a tristimulus colour meter.

Other devices related to colour measurement are disclosed in U.S. Pat. No. 3,3134,327 granted to Killpatrick et al on Apr. 18, 1967 and assigned to Honeywell, Inc. and U.S. Pat. No. 3,522,739 granted to Con et al on Aug. 4, 1970 and assigned to Princeton Applied Research Corporation. The former patent discloses a device employing spatial filters and three spectra in a colour meter capable of producing an electrical output indicative of the colour of a substance. The latter relates to a spectrophotometer apparatus utilizing a ratio measuring circuit. These devices all provide a method of specifying a colour of a target or sample in three basic units.

However, the disadvantages of the devices of the prior art have been many. The optical filters used in the devices of the prior art are complex and are made to exacting specifications in order to achieve uniformity resulting in great expense, and whilst having uniformity, they can be made only to approximate the CIE standard functions.

Instruments having spectral scanning techniques are in general, large and opto-mechanically complex. They have slow responses due to the need to scan slowly to achieve an adequate signal to noise ratio for the absorbtion characteristics of the sample. Subsequent digitisation and digital computation, involving a digital integration, can result in loss of accuracy in the case of discontinuous or rapidly varying characteristics where information is lost between digitised data points.

The devices of the prior art which use spatial filter techniques have not been developed to the stage that the advantages of fast responses, high accuracy, wide dynamic range, standardisation and simplicity of construction and manufacture have been achieved.

SUMMARY OF THE INVENTION

Accordingly, it is an object of the present invention to at least partially overcome these disadvantages by providing an instrument for the measurement of colour which comprises a light source which illuminates a sample, an electro-optical sensing head which receives the light from the sample and outputs electronic signals, and an electronic signal processing unit which together with the sensing head form an electro-optical analogue computer. The sensing head contains a dispersive optical component which creates a spectrum of the light from the sample and the spectrum is time and space modulated by a complex moving spatial filter. The light from the spatial filter is transferred by a photodetector to an electronic signal which is processed in an analogue electronic unit to give the tristimulus values X, Y, Z and the chromaticity coordinates x, y of the sample with respect to CIE standards for luminance and chromaticity values. The spatial filter is so constructed that a simple filament light source is seen by the instrument as a standard source.

There are many advantages obtained with the automatic computing colour meter of the present invention. The use of a complex spatial filter which can be accurately and inexpensively reproduced photographically from a master, prepared from large scale artworks results in an accurate representation of the CIE distribution functions. Light throughput is several orders of magnitude larger than that of the scanning spectrophotometer thereby resulting in greatly improved signal to noise ratio. Also, the employment of simple analogue electronic signal processing in conjunction with the complex spatial filter results in wide dynamic range, high accuracy, fast response and good signal to noise ratios, and automatically gives chromaticity values x and y and the tristimulus values X Y Z. These values are obtained without the necessity for digital integration techniques, and with reference to a standard source without the need for an actual standard source. A simple trim mask is used to balance any deviations from specified data. The construction of the present device is also relatively simple, resulting in a high performance to cost ratio instrument which has good application as a laboratory instrument or for on-line process control.

It is important to note that the response from the present device is significantly faster than the response produced by the devices of the prior art. Thus, it is particularly applicable and suitable for use in "on-line applications" reducing the time required for results from minutes to seconds.

It is also suitable for discontinuous and large amplitude variations in absorption spectra. Significantly, the present device will not miss data between digitising intervals as is found in some of the devices of the prior art.

To this end, in one of its aspects, the invention provides an apparatus for the measurement of colour of a sample which comprises:
(a) an illumination means adapted to illuminate a sample;
(b) an electro-optical sensing head adapted to receive the light from said illuminated sample; and
(c) an electronic processing unit adapted to process said light from said sample in conjunction with said electro-optical sensing head.

In another of its aspects, the invention provides
(a) a light source adapted to illuminate a sample;
(b) an electro-optical sensing head adapted to receive the light from the illuminated sample, the head including
 (i) means for dispersing the light from the sample to form a spectrum;
 (ii) a moving spatial filter adapted to modulate the spectrum in time and space;
 (iii) a masking means adapted to selectivity mask the light from the modulated spectrum;
 (iv) a means for transmitting pulses of light from the light source to a photodetector via a reference optical path which is independent of the sample (hereinafter referred to as said reference light pulses);
 (v) a photodetector adapted to detect the modulated spectrum and said reference light pulses and adapted to transform the modulated spectrum and the reference light pulses into an electronic signal;
(c) an electronic processing unit adapted to process the electronic signal into the respective chromaticity coordinates and tristimulus values of said sample, over a wide range of light levels.

In yet another of its aspects, the invention provides an apparatus for the measurement of colour of a sample which comprises an illumination means for illumination of the sample with light, the sample reflecting a part of the light; an electro-optical sensing head to receive the reflected light from the illuminated sample and to output electronic signals, the head comprising means for dispersing the reflected light from the sample to form a spectrum, a moving spatial filter to modulate the spectrum in time and space, a masking means to selectively mask the light from the modulated spectrum, means for transmitting pulses of light from the illumination means to a photodetector via a reference optical path thereby producing reference light pulses and a photodetector to detect the modulated spectrum and the reference light pulses to transform the modulated spectrum and the reference light pulses into an electronic signal; and an electronic processing unit to process the electronic signals from the electro-optical sensing head.

In another of its aspects, the invention further provides an apparatus for the measurement of colour of a sample which comprises:
(a) an illumination means adapted to illuminate a sample, said illumination means comprising a number of light sources and supports, the supports supporting the light sources and the sample in an integrating cavity wherein the light from the light sources illuminates the cavity and is reflected from the sample through a slit in the cavity;
(b) an electro-optical sensing head adapted to receive the light from the illuminated sample, the sensing head including
 (i) means for dispersing the light from the sample to form a spectrum, said dispersion means including
  (1) a collimating lens adapted to receive said light from said slit in said integrating cavity,
  (2) a diffraction grating adapted to diffract said collimated light from said collimating lens,
  (3) a focusing lens adapted to focus said diffracted light to a spectrum in a flat focal plane.
 (ii) a moving spatial filter adapted to modulate said spectrum in time and space, said filter including
  (1) timing marks on a face of said filter,
  (2) detection means adapted to detect the timing marks on the face of said filter and adapted to convert the movement of said timing marks into an electronic signal, said detection means being in combination, a pair of light emitting diodes and a pair of photodetectors adapted to detect the movement of said timing marks,
 (iii) a trim mask adapted to selectively mask said light from said modulated spectrum,
 (iv) a means for transmitting reference light from the illumination means to the detector, said means consisting of
  (a) an assembly of fibre optic light guides adapted to transmit light in a reference optical path;
  (b) an optical chopper adapted to gate the reference light into reference light pulses including timing marks and a detection means
 (v) a photodetector adapted to detect said modulated spectrum and reference light pulses and adapted to transform said modulated spectrum and reference light pulses into an electronic signal, said photodetector including a condenser lens adapted to condense the spectrum to a detection plane in said photodetector and a detection means in said photodetector adapted to detect said condensed spectrum;
(c) an electronic signal processing unit adapted to process the electronic signal into chromaticity coordinates and tristimulus values for the sample, the unit consisting of:
 (i) an automatic zero loop to eliminate errors due to detector dark current and electronic drifts;

(ii) an automatic gain control loop adapted to allow a large dynamic range of light levels to be accepted, and to maintain signal voltage levels at higher values than error voltages specified in the electronic components;

(iii) an automatic means adapted to produce a digital output of tristimulus values X, Y, Z and chromaticity values x, y to accuracies of the order of ±0.0001 for x, y with half a second response time and 36 watts of incandescent illumination in an integrating cavity.

BRIEF DESCRIPTION OF THE DRAWINGS

Further objects and advantages of the invention will appear from the following description taken together with the accompanying drawings in which:

FIG. 5 is a schematic representation of the device of the present invention.

FIGS. 6A, 6B, 6C and 6D are schematic respresentations of the trim spatial filter, modulating spatial filter and optical choppers suitable for use with the present invention.

FIG. 10D is a schematic representation of an optical setting and calibration device of the present invention.

DESCRIPTION OF THE PREFERRED EMBODIMENT

Figure 1:
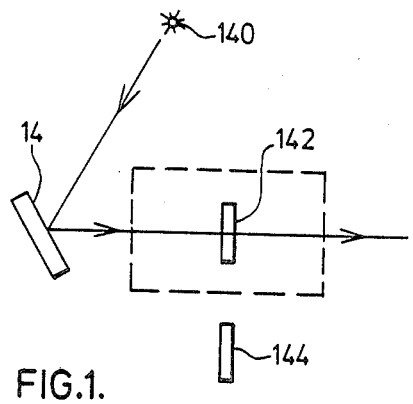
FIG. 1 is a schematic representation of an instrument having a light source, a target or sample and three tristimulus transmission filters.

Referring first to FIG. 5, there is disclosed a schematic representation of an embodiment of the device of the present invention.

Light sources 10 (with opaque disc 100 to prevent direct illumination of the sample) illuminate the inner surface of an integrating cavity 12. Light incident upon the sample 14 is scattered by the sample 14 and is received by the field lens 16. (In this case, diffuse reflection is shown but the instrument may be used for specular reflectance or transmittance or in a variety of ways well known to one skilled in the art. The present invention is not to be limited to a device using diffuse reflection).

The light emerging from the field lens 16 passes through entrance slit 18 and is collimated by lens 20 and then dispersed by a diffraction grating 22. Field lens 16 is to optimally couple the light from the sample into lens 20. Lens 24 and 26 bring a spectrum to focus at plane 28.

It is important that the optical design of lenses 20, 24 and 26 is created with particular attention to the flatness of the spectrum focal plane and spectral resolution in order that the spatial filters supported on substrate 30 and substrate 32 and the spectrum on plane 28 will be as coplanar as possible.

Substrate 30 carries a trim spatial filter 34 on its surface closest to plane 28 and substrate 32 carries a spatial filter 36 on its side closest to the plane 28. The depth of focus allows the close placement of the trim spatial filter 34 and the spatial filter 36 to the spectrum in plane 28 with negligible loss of resolution or focus.

A transmission filter 38 is placed over the red end of the spectrum to eliminate the second order diffracted light from the diffraction grating 22. The light which passes through the spatial filters 34 and 36 is then focused by the condenser lens 40 onto a detector generally indicated at 42. As the image on the detector is that of grating 22, all wavelengths have been recombined on the detector and therefore, wavelength integration is performed at the detector 42.

A fibre optic light guide 44 receives light from the light source 10 and transmits the light through an optical chopper 46 by means of imaging lens 48, 50 to the fibre optic light guide 52. The fibre optic light guide 52 terminates at position 54 at which position the light output from the light guide can be received by the detector 42. This light is referred to as "reference light pulses".

FIG. 6A shows a front view of a modulating or complex spatial filter 36 mounted on a glass disc substrate 32. Timing marks 56 and 58 are provided on the disc which are detected by light emitting diodes and photodetector pairs 60, 62 which in turn operate a timing generator (not shown). Filter aperatures 64, 66, 68 and opaque quadrant 70 are shown on the disc. For convenience, a spectrum 72 has been shown having wavelength variation along the disc radius. The disc is rotated in the direction shown by the arrow 74.

FIG. 6B is a side view showing the mounting of the filter 36 on the glass disc 32, which may be a metal film or clear and opaque parts in a photographic emulsion.

FIG. 6C shows a front view of a trim spatial filter 34 mounted on a substrate 30 with the transmission area of the filter indicated as 76.

Both the trim spatial filter and the modulating or complex spatial filter may be made by photographic means from large scale art works. This allows for an accurate representation in space of the CIE or any other computed distribution functions.

FIG. 6D shows a front view of the optical chopper 46 (of FIG. 5). It has a clear aperture 78 and a timing mark 80 in an opaque disc. A light emitting diode and phototransistor 82 detect the timing marks 80 and operate the timing generator as described hereinafter. Light from the fibre optic light guide 44 is imaged by lens 48 and 50 to the fibre optic light guide 52 through the aperture 78. Moveable vane 270 is provided for control of the light through aperture 78.

Figure 10A:
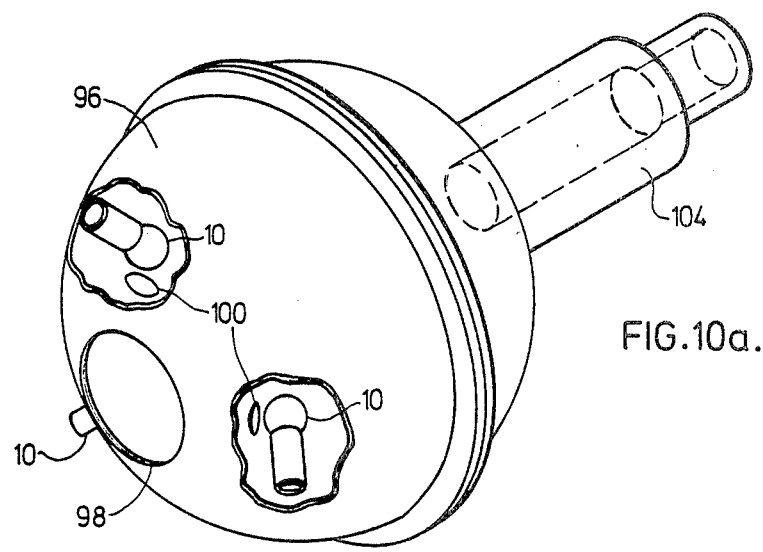
FIG. 10A is a perspective view of an integrating cavity suitable for use in the device of FIG. 10.
Figure 10B:
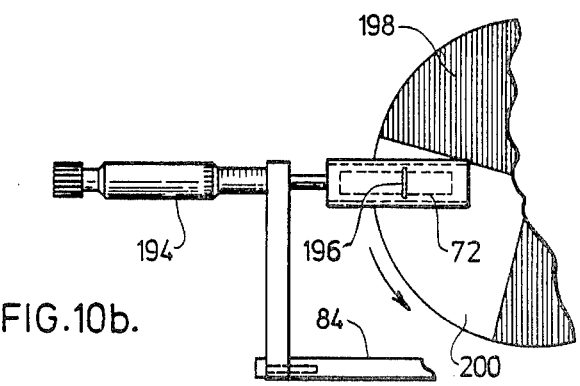
FIG. 10B is a schematic representation of a micrometer attachment for use in the present invention.
Figure 10:
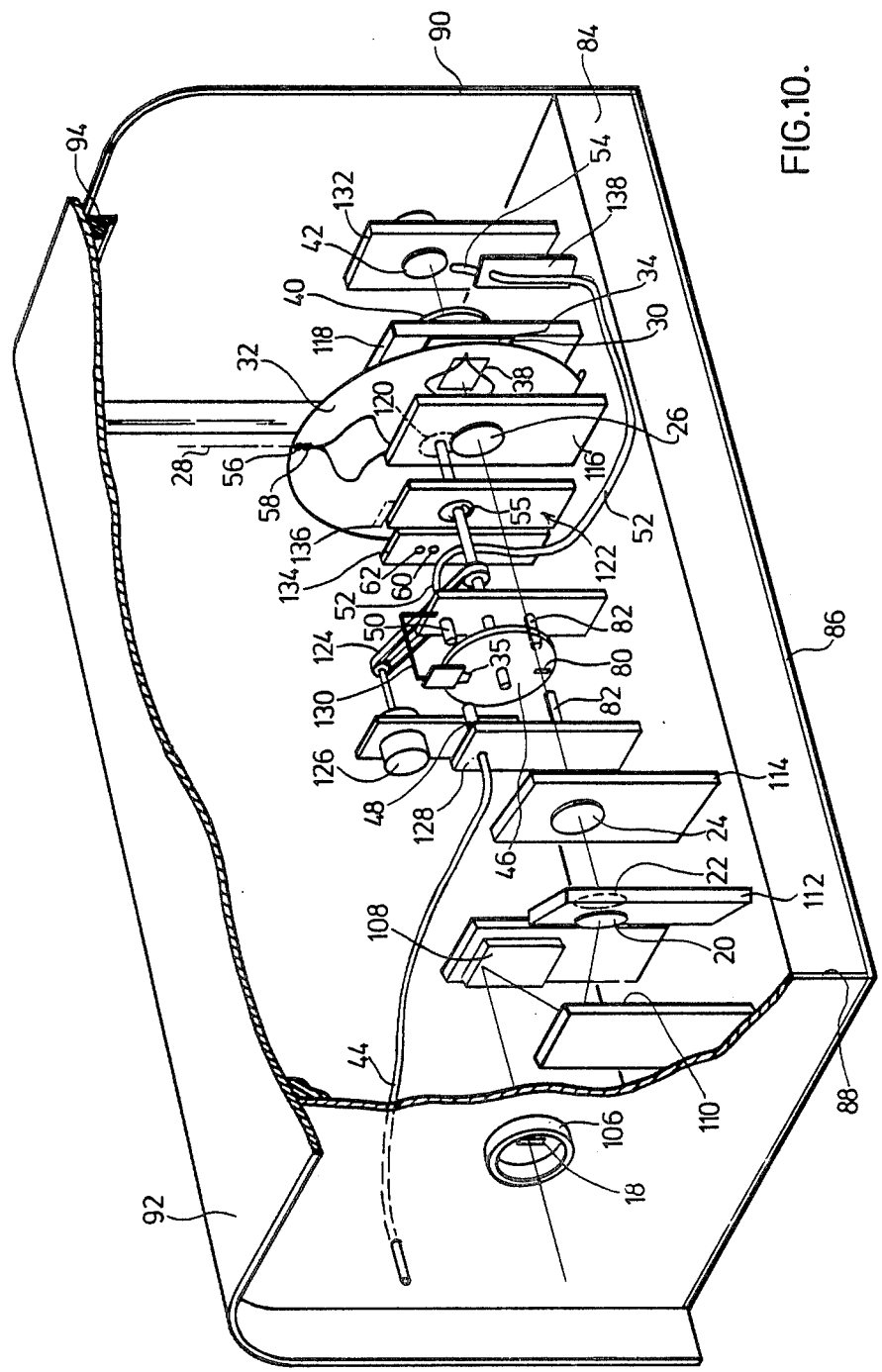
FIG. 10 is a cut-away plan view of the device of the present invention.

FIG. 10 is a cut-away perspective view of a preferred embodiment of the present invention illustrating the opto-mechanical stability and simplicity of construction of the device of the present invention.

Casting 84, has a base plate 86, and supports two end plates 88, 90 and a cover 92. A gasket 94 is used to effect a light tight seal about the casting.

The integrating cavity 96 (as shown in FIG. 10A in detail) is constructed from two hemispheres and has a sample aperature 98 and three lamps 10. Each lamp has an opaque disc 100 to prevent direct illumination of the sample which is placed over the aperture 98. The tube 104 connects the cavity to the end plate 88 by means of a ring 106 which contains the entrance slit 18. Mirrors 108 and 110 reflect the light to the collimating lens 20 which contains in its housing 112 a grating 22. The diffracted light is received by the focusing lens 24 in housing 114 and is directed to the lens 26 in housing 116.

Lens 24 and 26 produce a spectrum in focus at plane 28 which is coplanar with the trim mask 34 on support 30 which is held in mount 118. The disc 32 is held on a metal hub 120 on a shaft and bearing assembly 122 which in turn is driven by a flexible ring 124 from motor 126.

The optical chopper 46 is supported at the rear of the shaft assembly 122. The fibre optic light guides 44 and 52 and their associated lenses 48, 50 are supported in mounts 128, 130.

The condenser 40 is also held in the mount 118. The condenser 40 condenses the filtered light onto the photodetector 42 which is held in support 132. The LED photodetector pairs 60, 62 are supported on the posts 134 and 136 opposite the disc timing marks 56 and 58.

The fibre optic light guide 52 terminates at position 54 in mounting 138 near the detector 42.

This system includes rigidly mounted optics and a single moving part, which is a dynamically balance flywheel, and thus, the system is free of vibration and remains in alignment due to the precision bearing assembly. In instruments which have a grating scan movement, the mechanics of the sine bar and grating mount are much more complex compared to the device of the present invention, and require much more stringent environmental conditions.

A u.v. blocking filter 38 is also used over the red part of the spectrum to eliminate the second order blue light which is produced by the diffraction grating. That is, the light of 7800 Å (red, first order) is in the same position as 3900 Å blue of the second order. As the specified CIE coverage is from 3800 Å to 7800 Å, all light below 3900 Å must be blocked at the red end. The blocking filter is thus inserted over the red end of the spectrum to block all below 3900 Å. The u.v. of less than 3500 Å is absorbed by the optical system.

The optical system of the present invention must be aligned due to the need for coincidence of the spectrum focal plane 28 with the spatial filter surfaces 34 and 36, the need for correct dimensional matching of the spectrum and spatial filters and the need for correct superposition of the spectrum and spatial filters.

The spatial filters used in the present invention may be reproduced from a master which in turn, may be produced from photoreduction of large scale computer generated art works and thus, can be made to exacting standards relatively inexpensively.

FIG. 10D shows two spatial filters 172 and 174 corresponding to filters 34 and 36 having added to their patterns, sets of lines 176 which correspond to the spectral line positions of a mercury discharge lamp.

Replacement of the usual light source by a mercury discharge lamp gives a line spectrum. When the back plate 90, the detector 42 and the condensor 40 are removed, this allows direct viewing of the line spectrum which is produced in the focal plane 28. A simple microscope or magnifier may be used to observe the position of the spectral lines wth respect to the lines 176 on the spatial filters 172, 174 which are held stationary over the spectrum.

Fine adjustment of the mirror 110, the lens 20, the grating 22, the lens 24 and the trim filter 172 results in both lateral and longitudinal alignment of the filters and the spectrum. In the final assembly, the trim filter for any particular instrument is inserted and positioned with reference to the mercury line spectrum and the lines used for setting are subsequently masked off.

Figure 10C:
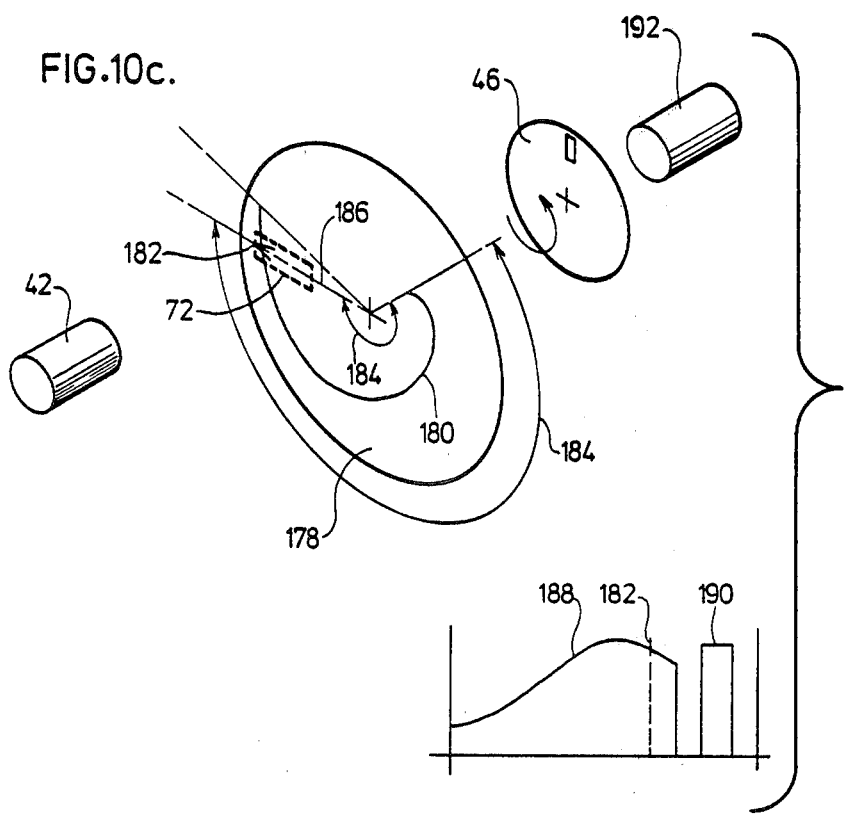
FIG. 10C is a schematic representation of a disc for slit scanning with the device of the present invention.

FIG. 10C shows a third disc 178 which may be used for calibration of the device to CIE standards. The disc 178 has a spiral slit 180 covering three quadrants of the disc. The point 182 on the spiral is characterized by the angle 184 and the radius 186 which uniquely determine the wavelength transmitted by the slit 180 at any rotational position of the disc.

A standard white sample of known response is used with the usual light source to calibrate the instrument. This calibration requires that the overall response function $\bar{I}(\lambda)$ $I(\lambda)$ be measured.

If the disc 36 is replaced by the disc 178, the resulting detector outut 188 is a spectral scan for three quadrants and a reference light pulse 190 for the fourth quadrant. Pulse 190 is used in a simple ratio circuit (see FIG. 15) to eliminate errors due to detector and electronic gain drifts and light source amplitude variations (as described hereinafter).

Wavelength calibration is obtained by the use of a shaft encoder 192 which is a means of precise measurement of angular position of the disc 178.

The detector output 188 and the encoder output can be digitised with high resolution over many data points and the signal averaged to obtain the required accuracy. This is a valid procedure as the response characteristic is smooth. This data is subsequently used in the calculation of the trim filter function $T(\lambda)$ and specification of the function $K(\lambda)$ (as described hereinafter).

FIG. 10B is a schematic representation of a micrometer attachment which may also be used to calibrate the device of the present invention. The micrometer attachment generally indicated as 194 drives a slit 196 over the spectrum 72. The micrometer setting may be calibrated against the known mercury spectrum lines thereby giving the wavelength for any micrometer position. The slit 196 is supported on a substrate which is optically the same as the trim filter substrate. A disc 198 having three clear and one opaque quadrant 200 is used in place of the usual disc 36.

The detector output is a signal and reference pulse alternating at the disc rotational speed. The signal pulse height is proportional to the roduct $\overline{l}(\lambda) I(\lambda)$ at any given wavelength. The reference pulse is used in the aforenoted ratio circuit to correct for the same factors of drift and change.

The mode of operation of the device will now be described. The spectrum which is produced in plane 28 is space and time modulated by the complex moving spatial filter 36 and the light from this filter and that, from the reference light pulses, is transformed by the photodetector 42 to an electrical signal which is processed in the electronic unit to produce chromaticity coordinates x, y and the tristimulus values X Y Z of the sample with respect to the CIE standard.

The following description will now involve a discussion of the theory used in the present invention.

Referring first to FIG. 1, there is shown a schematic representation of an instrument having a light source 140, a target or sample 14 and three tristimulus transmission filters 142, 144 and 146. The distribution functions of the various aforenoted components as amplitude with respect to wavelength would therefore become as follows:

(a) for the source 140, a function $\rho(\lambda)$
(b) for the sample 14, a reflectivity function $r(\lambda)$ and
(c) for the tristimulus filters 142, 144 and 146 functions $\overline{x}(\lambda)$, $\overline{y}(\lambda)$ and $\overline{z}(\lambda)$.

The tristimulus values, by definition, are as follows:

$$X = \frac{\int_0^\infty \overline{x}(\lambda) \cdot r(\lambda) \cdot \rho(\lambda) \, d\lambda}{\int_0^\infty \overline{y}(\lambda) \cdot \rho(\lambda) \, d\lambda} \tag{i}$$

$$Y = \frac{\int_0^\infty \overline{y}(\lambda) \cdot r(\lambda) \cdot \rho(\lambda) \, d\lambda}{\int_0^\infty \overline{y}(\lambda) \cdot \rho(\lambda) \, d\lambda} \tag{i(a)}$$

$$Z = \frac{\int_0^\infty \overline{z}(\lambda) \cdot r(\lambda) \cdot \rho(\lambda) \, d\lambda}{\int_0^\infty \overline{y}(\lambda) \cdot \rho(\lambda) \, d\lambda} \tag{i(b)}$$

expressed in units such that Y is numerically equivalent to the luminous reflectance value of the sample or target 14. The instrument response with filter 142 is $$\int_0^\infty \overline{x}(\lambda) \cdot r(\lambda) \cdot \rho(\lambda) \, d\lambda \tag{ii}$$

with filter 144 is $$\int_0^\infty \overline{y}(\lambda) \cdot r(\lambda) \cdot \rho(\lambda) \, d\lambda \tag{iia}$$

with filter 146 ia $$\int_0^\infty \overline{z}(\lambda) \cdot r(\lambda) \cdot \rho(\lambda) \, d\lambda \tag{iib}$$

Figure 2:
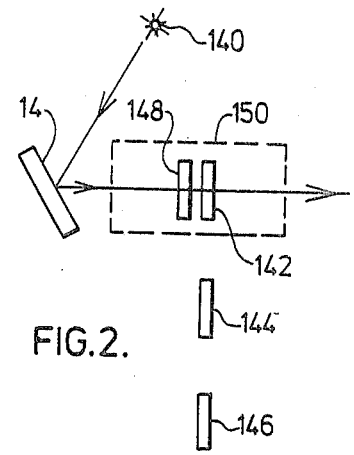
FIG. 2 is a schematic representation of an instrument having a light source, a target or sample, three tristimulus transmission filters and a trim filter.

FIG. 2 shows the addition of a trim filter 148 to the instrument of FIG. 1. As noted in FIG. 1, the distribution function of the source 140 is $\rho(\lambda)$ and the sample or target 14 has a reflectivity function of $r(\lambda)$. The instrument generally indicated as 150, including the optics, the detector and all the components affecting transmission with the exception of the trim filter 140 and three tristimulus filters 142, 144 and 146, has the overall transmission function $I(\lambda)$. If it is assumed that the trim filter 140 has a transmission function $T(\lambda)$ and the three tristimulus filters 142, 144 and 146 have the function $\overline{l}(\lambda)$, $\overline{m}(\lambda)$ and $\overline{n}(\lambda)$, then the response for each filter may be given by the following formulae:

$$R_l = \int_0^\infty \rho(\lambda) \cdot \overline{l}(\lambda) \cdot I(\lambda) \cdot T(\lambda) \cdot r(\lambda) d\lambda \tag{iiia}$$

$$R_m = \int_0^\infty \rho(\lambda) \cdot \overline{m}(\lambda) \cdot I(\lambda) \cdot T(\lambda) \cdot r(\lambda) d\lambda \tag{iiib}$$

$$R_n = \int_0^\infty \rho(\lambda) \cdot \overline{n}(\lambda) \cdot I(\lambda) \cdot T(\lambda) \cdot r(\lambda) d\lambda \tag{iiic}$$

If the response $R_l$, $R_m$ and $R_n$ are made equal to a response which is given by a CIE standard source with function $S(\lambda)$ and CIE standard distribution functions $\overline{x}(\lambda)$, $\overline{y}(\lambda)$, $\overline{z}(\lambda)$, then $$\int_0^\infty \rho(\lambda) \cdot \overline{l}(\lambda) \cdot I(\lambda) \cdot T(\lambda) \cdot r(\lambda) d\lambda = \int_0^\infty S(\lambda) \cdot \overline{x}(\lambda) \cdot r(\lambda) d\lambda \tag{iv}$$

and similarly for $\overline{m}(\lambda)$ and $\overline{n}(\lambda)$.

The remaining disclosure will deal only with the $\overline{l}(\lambda)$ filter function as $\overline{m}(\lambda)$ and $\overline{n}(\lambda)$ filter functions will be analogous.

Following from equation (iv), if $$\rho(\lambda) \cdot \overline{l}(\lambda) \cdot I(\lambda) \cdot T(\lambda) = S(\lambda) \cdot \overline{x}(\lambda), \tag{v}$$

then equation (iv) will be satisfied. Further, an arbitrary distribution function $K(\lambda)$ may be defined such that:

$$K(\lambda) = \rho(\lambda) \cdot I(\lambda) \cdot T(\lambda) \tag{vi}$$

where $T(\lambda)$ is the variable function to satisfy equation (vi).

Figure 3A:
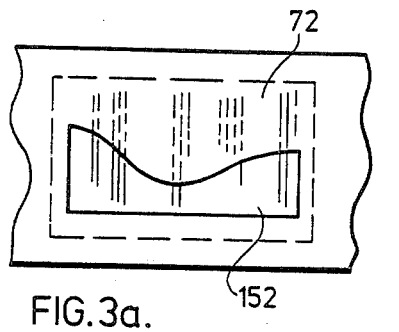
FIG. 3A is a schematic representation of a spatial filter overlayed on a dispersed spectrum and FIG. 3B is a schematic representation of a slit overlayed on a dispersed spectrum.
Figure 3B:
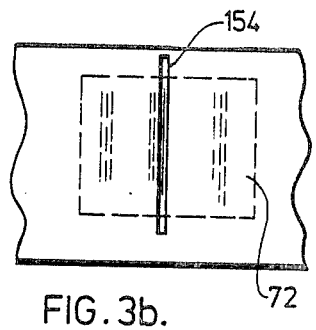

Referring now to FIGS. 3A and 3B, there is shown a spatial filter 152 which is overlayed on a dispersed spectrum 72 (FIG. 3A) and a slit 154 (FIG. 3B) scanning spectrum 72. The slit scan determines the spectral response of the instrument and source with respect to wavelength, which is defined as $E(\lambda)$ where $$E(\lambda) = \rho(\lambda) \cdot I(\lambda). \tag{vii}$$

Thus, combining equation (vi) and (vii), transposition produces $$T(\lambda) = \frac{K(\lambda)}{\rho(\lambda) \cdot I(\lambda)} = \frac{K(\lambda)}{E(\lambda)} \tag{viii}$$

Since $K(\lambda) = \rho(\lambda) \cdot I(\lambda) \cdot T(\lambda)$, equation (v) may be rewritten as $$K(\lambda) \cdot \overline{l}(\lambda) = S(\lambda) \cdot \overline{x}(\lambda) \tag{ix}$$
or -continued $$\overline{I}(\lambda) = \frac{S(\lambda) \cdot \overline{x}(\lambda)}{K(\lambda)} \tag{x}$$

and $\overline{I}(\lambda)$ is defined as a tristimulus distribution function related to the CIE standard $S(\lambda)$, $\overline{x}(\lambda)$ and a defined function $K(\lambda)$.

Combining this with the original equation (i), it is found that $$\frac{\int_0^\infty \overline{I}(\lambda) \cdot r(\lambda) \cdot \rho(\lambda) \cdot I(\lambda) \cdot T(\lambda) d\lambda}{\int_0^\infty m(\lambda) \cdot \rho(\lambda) \cdot I(\lambda) \cdot T(\lambda) d\lambda} = \tag{xi}$$

$$\frac{\int_0^\infty \overline{x}(\lambda) r(\lambda) \cdot S(\lambda) d\lambda}{\int_0^\infty \overline{y}(\lambda) \cdot S(\lambda) d\lambda} = X_s$$

where $X_s$ is a tristimulus value with respect to a CIE standard source $S(\lambda)$ and standard CIE distribution function $\overline{x}(\lambda)$.

As is well known, the chromaticity coordinates are defined as follows:

$$x = \frac{X}{X + Y + Z} \tag{xii}$$

$$y = \frac{Y}{X + Y + Z} \tag{xiii}$$

Figures 4A, 4B:
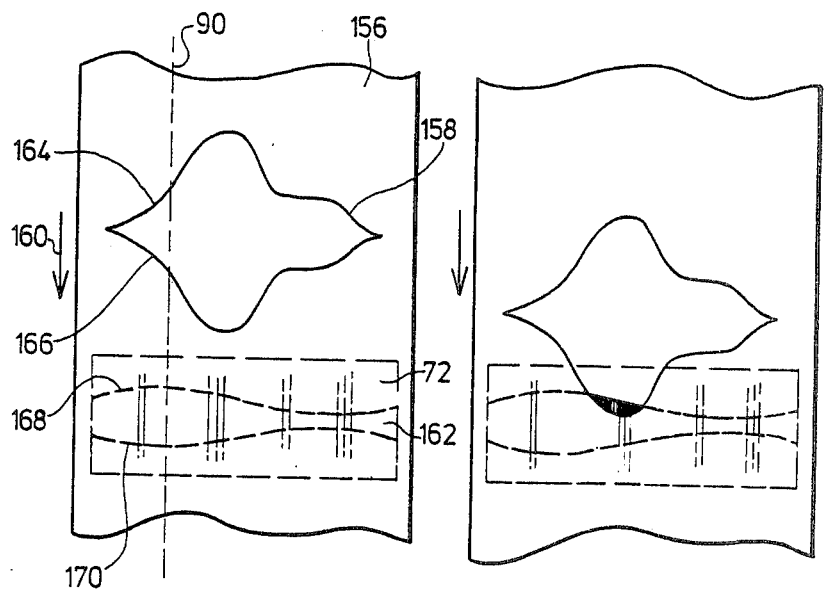
FIGS. 4A and 4B are schematic representations of a moving spatial filter which is modulating a spectrum in both time and space.

As the denominator is common in the definitions of x, y and z tristimulus values, the chromaticity coordinates may be written as follows:

$$x = \frac{R_l}{R_l + R_m + R_n} \tag{xiv}$$

$$y = \frac{R_l}{R_l + R_m + R_n} \tag{xv}$$

where $$R_l = \int_0^\infty \overline{I}(\lambda) \cdot K(\lambda) \cdot r(\lambda) d\lambda = \tag{xvi}$$

$$\int_0^\infty \overline{x}(\lambda) \cdot S(\lambda) \cdot r(\lambda) d\lambda$$

where
$K(\lambda) = \rho(\lambda) \cdot I(\lambda) \cdot T(\lambda)$
and
$\overline{I}(\lambda) = \frac{S(\lambda) \cdot \overline{x}(\lambda)}{K(\lambda)}$ FIGS. 4A and 4B show a schematic representation of a moving spatial filter which is modulating a spectrum in both time and space. An opaque slide 156 which contains an aperture 158 which is a spatial filter, moves in the direction shown by the arrow 160. It therefore exposes the spectrum 72 which is dispersed perpendicularly to the direction of motion of the slide 156. Trim filter $T(\lambda)$ 162 defines an aperture distribution function $T(\lambda)$ over spectrum 72 and the spatial filter 158 has an aperture function $\overline{I}(\lambda)$.

As the spatial filter moves over the spectrum, the response is the convolution of the functions $\overline{I}(\lambda)$ and the spectral energy in the height bounded by $T(\lambda)$, dependent on the velocity of the aperture 158, which introduces a time variable.

The convolution is written in general, for two functions f(x) and g(x) as $$F(\alpha) = \int_{-\infty}^\infty f(x) \cdot g(x - \alpha) dx \tag{xvii}$$

It is assumed that $a(\lambda)$, $b(\lambda)$, $c(\lambda)$ and $d(\lambda)$ are arbitrary functions which control the shape of the spatial filter edges 164, 166, 168, 170 such that $$a(\lambda) - b(\lambda) = \overline{I}(\lambda) \tag{xviii}$$

and $$c(\lambda) - d(\lambda) = T(\lambda) \tag{xviv}.$$

The energy distribution in the spectral line $\lambda_1$ at 170 before the trim spatial filter and with a target having reflectance of $r(\lambda_1) = 1$ is defined as W(x), where $$\int_{-\infty}^\infty W(x) dx = E(\lambda_1) \tag{xx}$$

and the direction of increasing x is defined by arrow 160.

The trim spatial filter which overlaps the spectrum is a discontinuous function T(x) at $\lambda_1$ having value $$T(x) = 1 \text{ when } c(\lambda_1) \leq x \leq d(\lambda_1)$$
$$0 \text{ in all other cases.}$$

Therefore, the trim spatial filter spectrum combination will be a function $W(x) \cdot T(x)$ where $$\int_{-\infty}^\infty W(x) T(x) dx = K(\lambda_1) \tag{xxi}$$

determines the value T(x).

The spatial filter 158 has a similar discontinuous function L(x), where $$L(x) = 1 \text{ when } a(\lambda_1) \leq x \leq b(\lambda_1)$$
$$= 0 \text{ in all other cases.}$$

The convolution therefore may be written for a displacement variable $\alpha$ as $$f(\alpha) = \int_{-\infty}^\infty L(x - \alpha) \cdot T(x) \cdot W(x) dx \tag{xxii}$$

where
$a(x_1) \leq (x - \alpha) \leq b(\lambda_1)$

As the spatial filter moves with a velocity v, transposition to time variables can be made with time increasing in the x direction. Using $\alpha = vs$ and $x = vt$, where s and t are time variables, $$f(s) = \int_{-\infty}^\infty L(t - s) \cdot T(t) \cdot W_1(t) dt \tag{xxiii}$$

with a change in the function limits $$L(t) = 1 \text{ when } \frac{a(\lambda_1)}{v} \leq (t - s) \leq \frac{b(\lambda_1)}{v}$$

and $L(t) = 0$ in all other cases

-continued and $T(t) = 1$ when $\frac{c(\lambda_1)}{v} \leq t \leq \frac{d(\lambda_1)}{v}$ and $T(t) = 0$ in all other cases.

The convolution $$\int_{-\infty}^{\infty} F(t-s)T(t)W(t)dt$$

is limited by $$F(t) = 1 \text{ when } \frac{a(\lambda_1)}{v} \leq t \leq \frac{b(\lambda_1)}{v}$$

at any wavelength and the time width of the filter is $$\frac{b(\lambda_1)}{v} - \frac{a(\lambda_1)}{v} = \left(\frac{1}{v}\right)\bar{I}(\lambda_1) \text{ when } \bar{I}(\lambda_1) = b(\lambda_1) - a(\lambda_1)$$

Therefore, an increase in v requires a proportional increase in $\bar{I}(\lambda_1)$ to compensate.

Integrating over all wavelength gives the following:

$$R_s v = \int_0^\infty \int_{-\infty}^{\infty} L[(t-s)_1\lambda] \cdot T[t_1\lambda] \cdot W_1[t_1\lambda]dtd\lambda \quad \text{(xxiv)}$$

which is dependent on the velocity v and is a variable with time.

Integration over time with a sample of reflectance $r(\lambda)$ gives the following:

$$R_v = \int_{-\infty}^{\infty} \int_{-\infty}^{\infty} \int_{-\infty}^{\infty} L[(t-s)_1\lambda] \cdot T[t_1\lambda] \cdot W_1[t_1\lambda] \cdot r(\lambda)dtd\lambda ds \quad \text{(xxv)}$$

which has a single value for a constant velocity v.

As $R_v$ is a function of $\bar{I}(\lambda)$, $T(\lambda)$, $E(\lambda)r(\lambda)$ and velocity v, it may be written $$R_v = \tau_v \int_0^\infty \bar{I}(\lambda) \cdot T(\lambda) \cdot E(\lambda) \cdot r(\lambda)d\lambda = \quad \text{(xxvi)}$$

$$\tau_v \int_0^\infty \bar{I}(\lambda)T(\lambda) \cdot \rho(\lambda) \cdot J(\lambda) \cdot r(\lambda)d\lambda$$

where $\tau_v$ is a time constant dependent on velocity.

This data may be extended to many spatial filters in succession, spaced such that the response from each modulation do not overlap, and alternate with spatial filter functions $\bar{l}(\lambda)$, $\bar{m}(\lambda)$, $\bar{n}(\lambda)$, $\bar{l}(\lambda)$, $\bar{m}(\lambda)$ ... and this gives periodic responses $R_{vl}$, $R_{vm}$, $R_{vn}$, $R_{vm}$ ... provided that the time integration is initialized to zero for each filter in turn.

As the time constant is the same for all responses $R_v$, all filters having the same velocity, $R_v$ may be used in the calculation of x and y as follows:

$$x = \frac{R_{vl}}{R_{vl} + R_{vm} + R_{vn}} \quad \text{(xxvii)}$$

$$y = \frac{R_{vm}}{R_{vl} + R_{vm} + R_{vn}} \quad \text{(xxviii)}$$

The device of the present invention embodies the automatic computation of the complicated triple integral of equation (xxv). This integral is computed by analogue means and all data is used, thus giving accurate integrals of all types of functions including those which have rapidly changing characteristics, discontinuities, and fine structure which are not suitable for digitising and integration by digital methods.

A response $R_{vr}$ is also obtained as the integral of the reference light pulses (which is described in the electronic signal processing) which is of the form:

$$R_{vr} = T_v \int_0^\infty \rho(\lambda)J(\lambda) \cdot d\lambda \quad \text{(xxix)}$$

where $J(\lambda)$ is the spectral response of the reference path and the detector.

$T_v$ is also the time constant for the optical chopper which is rigidly coupled to the spatial filter disc 32.

For a source 10 having a constant spectral output, the denominator of equation (i) is dependent only upon amplitude. The expression for $R_{vr}$ following the integration sign is similarly amplitude dependent. By selection of an appropriate constant factor (which, in practice, may be an adjustable electronic gain as described hereinafter), the tristimulus values may be computed from the following equation:

$$X = k \frac{T_v \int_0^\infty \bar{I}(\lambda)T(\lambda)\rho(\lambda)J(\lambda)r(\lambda)d\lambda}{T_v \int_0^\infty \rho(\lambda)J(\lambda)d\lambda} = \frac{R_{vl}}{R_{vr}} \quad \text{(xxx)}$$

where k is constant and $J(\lambda)$ is a fixed function dependent on the reference optical path and detector characteristics, and $R_{vr}$ is the reference response.

X is therefore independent of light source amplitude and similarly independent of detector sensitivity and electronic gain changes.

By similar calculations, Y and Z may be calculated and $$Y = \frac{R_{vm}}{R_{vr}}$$

and $$Z = \frac{R_{vn}}{R_{vr}}$$

The foregoing theory and utility upon which the present device is predicated was derived using rectangular coordinates but is equally applicable to any other coordinate system with proper transposition. In this case, the aperture function $\bar{I}(\lambda)$ is transposed to an arc length where the arc length is given by $\bar{I}(\lambda) \cdot r(\lambda)$, and the radius $r(\lambda)$ being the corresponding radius on the disc. This thus compensates for the linearly increasing velocity of the disc with increasing radius.

A spectrum is shown at 72 in FIG. 6A which has wavelength variation along the disc radius. Ideally, the line formed by any one wavelength would have the same radius of curvature as the disc at that point. It is practical to curve all such spectral lines by the same amount by means of a curved entrance slit in which case only one wavelength may be transposed exactly and the remainder will have a small curvature error dependent on the height of the spectrum. This error is negligibly small for small height spectra.

Figure 9:
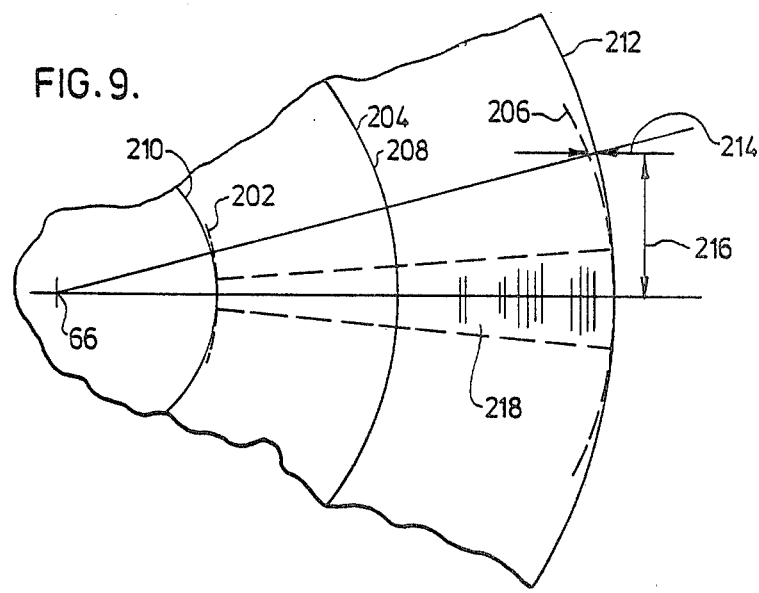
FIG. 9 is a drawing showing part of a circular spatial filter and spectral lines of equal curvature.

Referring now to FIG. 9, there is shown a circular spatial filter and spectral lines of similar curvature. The curvature of spectral lines 202, 204, 206 are shown similar to that of the filter at radius 208. Other filter radii are shown at 210, 212. If the filter radius 212 is defined as R and the radius 204 as $R_o$, the error E at position 214, to a first order approximation is given by $$E \approx \left(\frac{L^2}{2}\right)\left(\frac{1}{R} - \frac{1}{R_o}\right)$$

$$= \left(\frac{L^2}{2}\right)\left(\frac{R_o - R}{RR_o}\right)$$

where L is the height 216. For a radius $R_o=2$, $R=2.5$ and $L=0.25$, then $E=0.003$ inches. For a 1 inch wide spectrum covering 4000 Å bandpass, $$E = 0.003 \times 4000$$
$$= 12 Å$$

which would be equivalent to a spectral shift at the corner of the spectrum. As the error is proportional to $L^2$, it is rapidly reduced towards the spectrum centre line. It is preferable to have a wedge shaped spectrum 218 to minimise curvature errors. The trim mask $T(\lambda)$ is therefore preferred as a similar overall wedge shape and $K(\lambda)$ is defined accordingly, to satisfy any specified wavelength accuracy.

Figure 7:
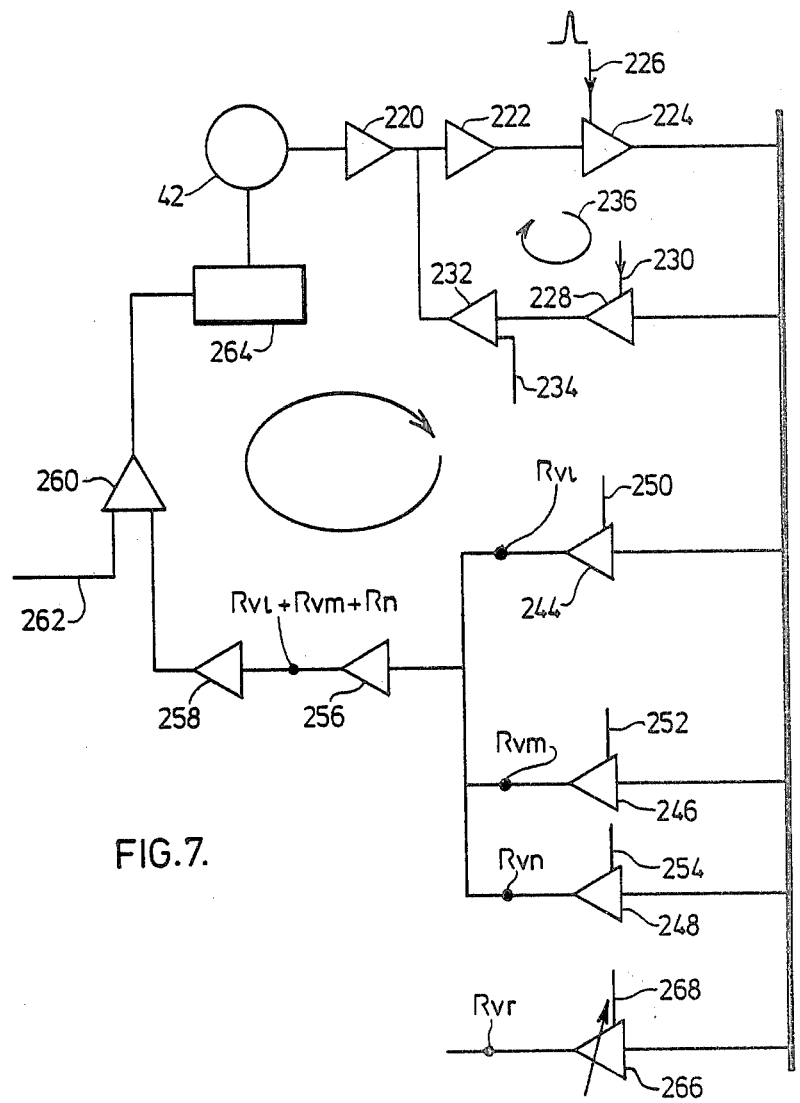
FIGS. 7, 7A and 7B are block diagrams of the electronic signal processing unit of the present invention.

FIG. 7 is a block diagram of the signal process unit of the present invention. The photodetector 42 has an output which is periodic having a repeated sequence which corresponds to red, green, blue, dark, reference. The photodetector output is fed to an amplifier 220 and then to an inverter stage 222 and then to an integrater 224. The integrater 224 is discharged or reset after each integration of red, green, blue . . . by means of a reset pulse 226. The reset pulse and all other signal processing pulses are shown in FIG. 8 and are generated from the disc timing marks by the LED/photodetector pairs 60, 62 and 82 input to the timing generator (as explained hereinafter).

The integrated dark value is sampled and held by circuit 228 which is controlled by pulse 230. This value is fed to an error integrator amplifier 232 with a nominal zero reference 234. The output is fed back into the input of inverter 222 and closes a loop 236 which is an autozero loop. Adjustment of the reference 234 allows the output of the main integrator 224 to be zero just prior to the dark reset pulse. By this means, the photodetector dark current and any offsets in the stages 220, 222 and 224 are eliminated from the system.

Figure 8:
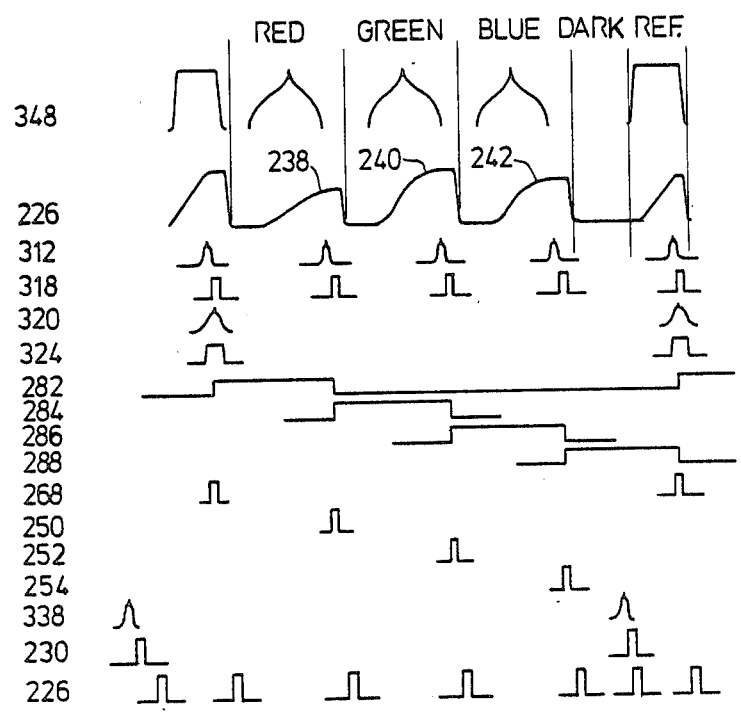
FIG. 8 is a diagram showing the timing and signal waveforms in the electronic signal processing unit of FIGS. 7 and 7A–7B.

Referring to FIG. 8, the sequential maxima of the integrator 238, 240, 242 corresponding to red, green and blue just prior to resetting one proportional to $g_1R_{vl}$, $g_2R_{vm}$, $g_3R_{vn}$ where $g_1$, $g_2$, $g_3$ are scaling factors due to the disc geometry. These factors are determined by the differences in the maxima of the calculated $\bar{l}$ $\bar{m}$ $\bar{n}$ functions relative to the normalised equal angular maxima of the disc apertures. This normalisation is used to optimise light throughout. $g_1R_{vl}$ $g_2R_{vm}$ $g_3R_{vn}$ are proportional to the tristimulus values as the wavelength integration is performed at the photodetector surface 42 and time integration is performed by the electronic integrator 224.

The integrated red, green, blue values 238, 240, 242 are sampled and held by circuits 244, 246, 248 (FIG. 7) and are controlled by pulses 250, 252, 254 with appropriate gains $G_1$, $G_2$, $G_3$, which compensate for $g_1$, $g_2$, $g_3$, the scaling factors (as explained hereinbefore) of the apertures in the spatial filter. This, together with the arbitrary function $K(\lambda)$ allows for maximum light throughput and thus maximum signal to noise ratio.

The outputs of sample and holds 244, 246, 248 are $R_{vl}$ $R_{vm}$ $R_{vn}$ and are therefore proportional to X Y Z tristimulus values. These outputs are summed by summing amplifier 256 thus giving the output proportional to $X+Y+Z$ ($R_{vl}+R_{vm}+R_{vn}$).

A second control loop which may be described as an automatic gain control (AGC) is completed by an inverting stage 258, an error amplifier integrator 260 having a nominal reference voltage of 10 volts 262, and voltage programmable high voltage power supply 264 which controls the gain of the photodetector 42. The photodetector is in this instance, a photomultiplier tube but is not restricted to this type of detection means. For example, a fixed gain solid state detector followed by a voltage programmable gain controlled amplifier at position 220 can also be a suitable detector means.

By means of this AGC loop, the sum $X+Y+Z$ is always driven to the value set by the reference 262, and in this case, 10 volts. For example, if the sample or target is abruptly changed from one of high luminance value to one of low luminance value, then the error integrator amplifier output will increase, increasing the high voltage until the detector gain satisfied the condition that $X+Y+Z$ is equal to the reference voltage 262.

This AGC loop gives a wide dynamic range for both sample luminance value and source output power and maintains the signals at optimum working levels. The integrated reference light pulse signal is amplified and sampled and held by circuit 266 controlled by pulse 268 and is the signal $R_{vr}$. The gain of circuit 266 is adjustable so that the $R_{vr}$ signal level may be precisely adjusted, and approximates $R_{vm}$ (Y) for the purpose of calibration, corresponding to the constant k.

The input signal level to circuit 266 is always much less than $R_{vm}$ (max) in order to give adequate dynamic range. For example, the level would need to be fifty times less for a range of 2% to 100% for Y reflectance values.

Coarse control of $R_{vr}$ to allow for many different instrument applications is achieved by means of an attenuating vane 270 (see FIG. 6D) in the reference light optical path.

In summary, the signals $R_{vl}$ $R_{vm}$ $R_{vn}$ $R_{vr}$ are present at the outputs of circuits 244, 246, 248, 266 and $R_{vr}$ is adjustable to satisfy the calibration.

Further processing of these signals to give X Y Z and x, y involve division operations and may be achieved in a variety of ways. One such way is by digitising the four signals $R_{vl}$ $R_{vm}$ $R_{vn}$ $R_{vr}$ and processing them in a simple digital calculator. It is emphasized however that digitisation is only performed after analogue integration and it may not be substituted for the analogue circuitry as described in FIG. 7.

Figure 7A:
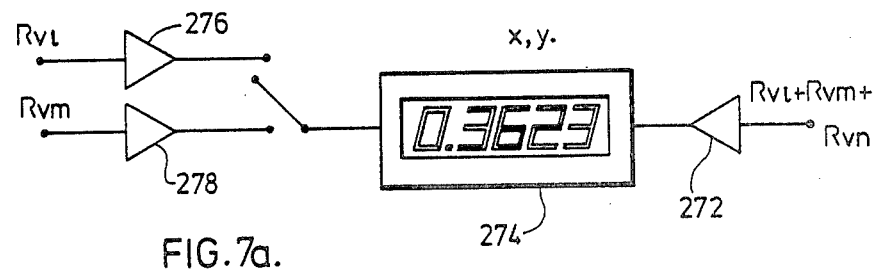

A second method is by the use of a combination of analogue circuitry and digital circuitry which utilises standard components and is shown in FIG. 7A.

The output of the summing amplifier 256 is smoothed by the amplifier 272 and the output is used as the reference for the digital panel meter (DPM) 274. The outputs of the sample and holds 244 and 246 (X Y) are also fed to smoothing amplifiers 276 278 and these outputs are used as the signals for the DPM 274 by switched selection. The DPM is used in a ratiometric configuration which gives an output $$\frac{X}{X + Y + Z}$$

or $$\frac{Y}{X + Y + Z}$$

which is x, y chromaticity coordinates. The AGC loop maintains the sum within the limits required by the DPM, in this particular case, 10±1 volts and the decimal point presentation is adjusted to read correctly the values of x and y.

The instrument response time is governed by the time constants of the smoothing amplifiers 276, 278, 272 and the response and damping in the error amplifier integrators 232 and 260. With 36 watts of illumination in an 8 inch integrating cavity with a white sample of approximately two inches diameter, accuracies of ±0.0001 for x and y are obtained with an optical path of eighteen inches length with a time constant of 470 milliseconds. The electronic specifications are in turn governed by the light throughput the spatial filter rotational speed which are chosen for the particular application.

The smoothing amplifiers 276, 278, 272 have switched time constants which increases the response time and improve the signal to noise ratio in the event that greater than ±0.0001 accuracy of x and y is required.

Figure 7B:
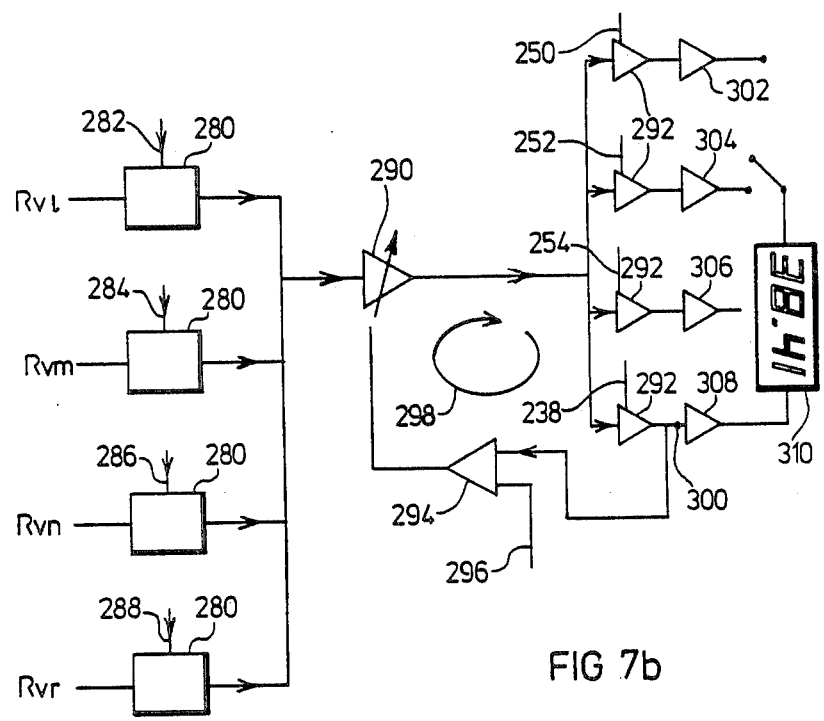

The electronic process for X Y Z will now be explained with particular reference to FIG. 7B.

The signals $R_{vl}$ $R_{vm}$ $R_{vn}$ $R_{vr}$ are gated by gates 280 controlled by gate pulses 282, 284, 286, 288 and are passed through the voltage programmable gain controlled amplifier 290 to a set of sample and holds which are controlled by the sample pulses 250, 252, 254, 268. The reference signal 300 is fed to an error amplifier integrator 294 having a 10 volt reference 296. The output error voltage is fed to the voltage programmable gain controlled amplifier 290. The loop 298 forces the output of the signal reference 300 to become equal to the 10 volt reference. Smoothing amplifiers are used also at 302, 304, 306, 308 and the outputs are fed to a ratiometric digital panel meter (shown as switched) 310. $R_{vl}$ $R_{vm}$ $R_{vn}$ are measured therefore with respect to $R_{vr}$ and are the tristimulus values X Y Z (in this case, illustrated as percentage levels).

Figure 11:
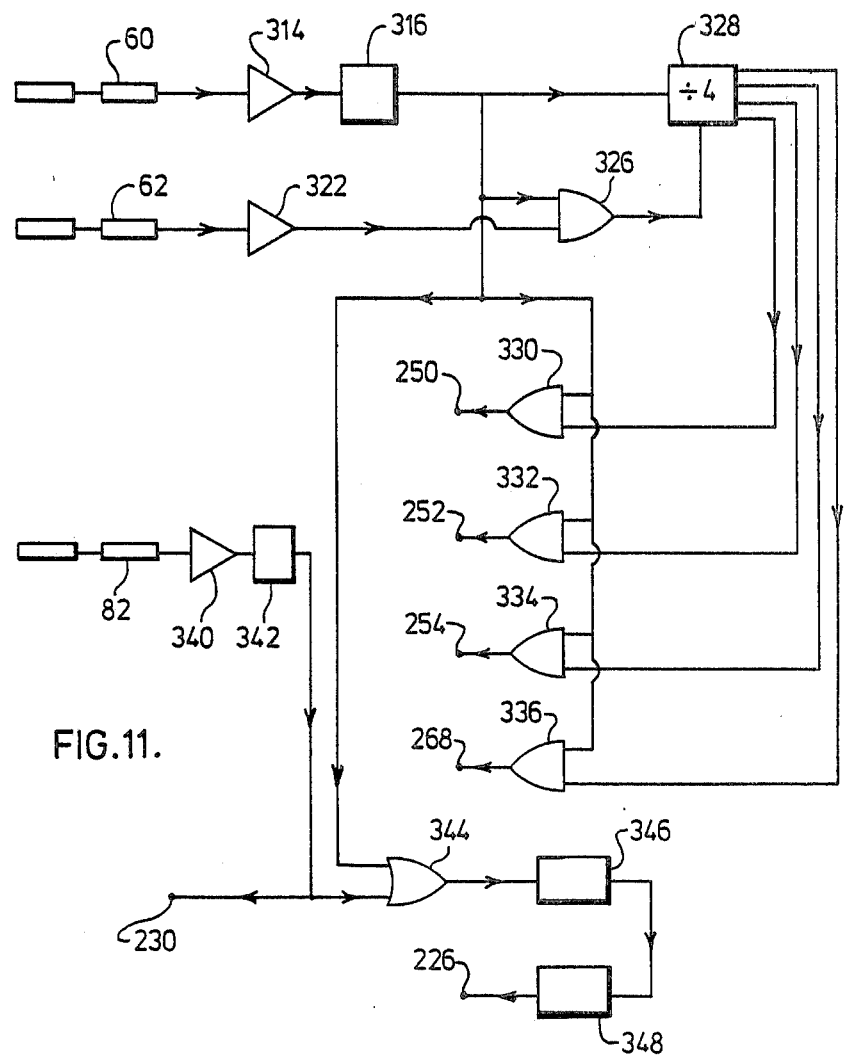
FIG. 11 is a schematic representation of the timing generator of the present invention.

Reference is now made to FIGS. 8 and 11 for an explanation of the timing generator 268 of FIG. 7.

The signal 312 from the LED/photodetector 60 is squared off and inverted by comparator 314. This output is then fed to a timer 316 which produces pulses 318.

Signal 320 from the LED/photodetector 62 is similarly squared off by comparator 322 producing pulses 324 which overlap pulses 318.

Pulses 318 and 324 are "and gated" by gate 326 and this output, along with pulse 318 is fed to a divide by-four counter 328 which has four decoded outputs 282, 284, 286 and 288. These outputs are "and gated" with pulses 318 by gates 330, 332, 334, 336 which produces output pulses 250, 252, 254, 268.

The signal 338 from the LED/phototransistor 82 is squared off by a comparator 340 and this output is fed to a timer 342 producing pulses 230. Pulses 230 and 318 are "OR" gated by "OR gate" 344 which output is fed to a delay timer 346, to a timer 348 to produce output pulses 226.

The functions of these pulses are as follows:

| Pulse | Function |
| --- | --- |
| 226 | reset integrator 224 |
| 230 | sample "dark" |
| 250 | sample "red" |
| 252 | sample "green" |
| 254 | sample "blue" |
| 268 | sample reference |
| 282, 284, 286, 288 | open X, Y, Z, reference gates 280, 292 |

Photodetector 42 signal waveform is shown in FIG. 8 at 348 and the output of integrator 224 is shown as 226 in FIG. 8.

The response $\rho(\lambda)\cdot I(\lambda)$ is determined by a spectrum scan at plane 28. The measured response $\rho(\lambda)\cdot I(\lambda)$ is used in the equation $$T(\lambda) = \frac{K(\lambda)}{\rho(\lambda) \cdot I(\lambda)}$$

to determine $T(\lambda)$. The arbitrary function $K(\lambda)$ is selected to maximise the light throughput and to produce a trim mask shape which minimises errors due to spectral lines which have errors in curvature from the corresponding spatial filter radius.

Figure 15:
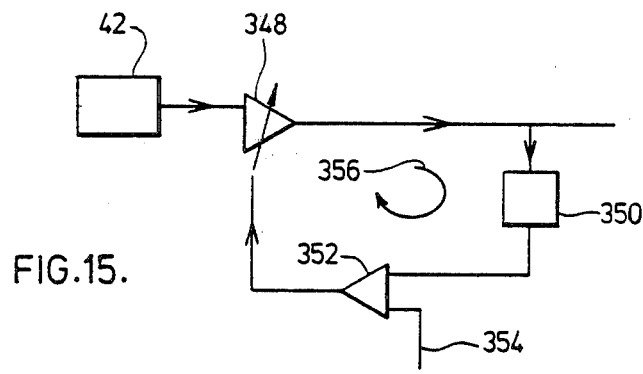
FIG. 15 is a block diagram of a simple ratio circuit for calibration.

FIG. 15 is a schematic representation of a simple circuit used for calibration. The signal from the detector 42 is passed through a voltage programmable gain control amplifier 348. The output is gated by gate 350 allowing the reference light pulse to be fed to an error amplifier integrator 352 having a reference of nominally 10 volts 354. The output of 352 controls the gain of amplifier 348 and the closed loop 356 maintains the reference light pulse height at a constant level. The response function product $\rho(\lambda)I(\lambda)$ is therefore obtained independent of source amplitude variations or detector and electronic gain changes.

It is also an advantage of this invention that the electronic and optical units are individually calibrated and may be freely exchanged between complete instruments, rendering assembly and service more flexible and reducing costs.

The device of the present invention provides a markedly improved method and apparatus for measuring colour. It performs its functions to a high order of accuracy by means of analogue integration.

Figure 12:
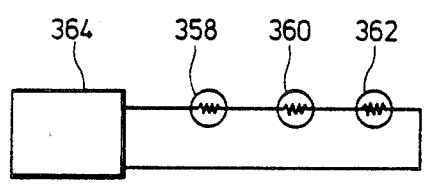
FIG. 12 is a schematic representation of a second embodiment of a light source of the present invention.

With reference to FIG. 12, in order to optimise the operation of the colour meter of the present invention, a preferred embodiment has been invented which shows a number of lamps 358, 360, 362 run in series from a constant current source 364. When the lamp temperatures have stabilised, that is, after the warm up period, the light output becomes constant. The power source 364 is stabilised against line variations and produces a constant current in the lamps 358, 360, 362 independent of lamp resistance.

The use of a number of lamps gives an average spectral output and routine lamp replacement on a rotational basis reduces the effects of aging on spectral output.

Tungsten halogen lamps are well known for their spectral stability with age when run at constant temperature.

The spectral output is adjustable over a limited range of colour temperature with such lamps and this is used as a fine adjustment for any lamp spectral aging. The overall lamp output does not affect the measurements as described hereinbefore.

Figure 13:
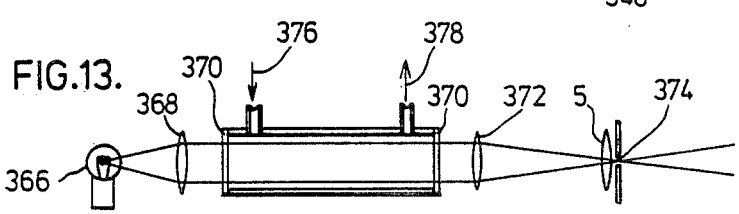
FIG. 13 is a schematic representation of the use of a liquid sampling cell for use with the present invention.

A further embodiment of the invention is its use of a liquid sampling cell as shown in FIG. 13. Light from source 366 is collimated by lens 368 and passes through cell windows 370 to lens 372 which focuses the source on the entrance slit 374. The liquid or gas to be tested is inserted into the cell via cell ports 376 and removed via cell port 378. Thus, a continuous sampling of a liquid or a gas may be obtained with the invention of the present application.

Figure 14:
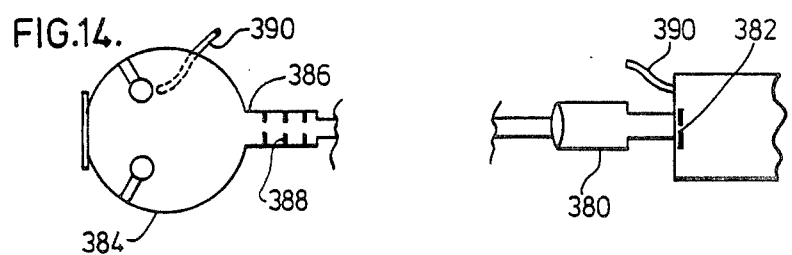
FIG. 14 is a schematic representation of the use of a telescope for use with the present invention.

A still further application and embodiment of the present invention is shown in FIG. 14. A telescope 380 which has any particular chosen field of view is affixed to the front of the colour meter directly in front of the entrance slit 382. The telescope is used to view remote objects. The source for such remote objects can be an integrating cavity 384 with the addition of a short tube 386 with light baffles 388 to block stray illumination to the sample. A long fibre optic 390 is used if the tristimulus values are required, but is omitted if only the chromaticity coordinates x y are required.

A further application for this device is the use of the invention as an instrument for airborne survey work, for example, to view crops in fields below. The source, in this embodiment, would be the sun and the solar radiation may be used as the source over limited periods of time when spectral changes were small. Although the unit in this case would only approximate the CIE system of units, it nevertheless is an accurate measurement tool for subtle changes in terrain colour and has particular application for research into such areas as crop ripeness and disease.

Figure 16:
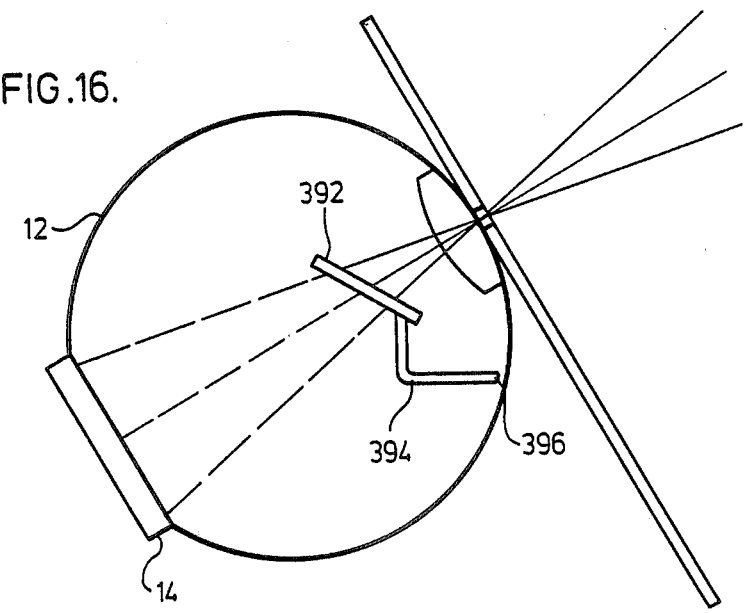
FIG. 16 is a schematic representation of the cavity suitable for use with another embodiment of the present invention.

Referring now to FIG. 16, there is shown the cavity 12 with the fibre optic assembly as shown in FIG. 5, removed therefrom. The assembly has been replaced by a switching mirror 392 supported by an arm 394 on a pivot 396 on the wall of the cavity 12.

This structure allows the optical path to be alternated between the sample and the wall of the cavity which is the reference. Using this apparatus, the reference light is transmitted by the identical optical path as is the signal light from the sample. Thus, any changes in the optical path due to attenuation by dust, small changes in reflection and transmission characteristics, drifts due to thermal gradients and other causes are all eliminated and do not affect the measurement.

The spectral reflection characteristics of the mirror 392, that is, MR ($\lambda$), can be measured accurately, for the purposes of evaluation of the tristimulus values X, Y and Z by use of a standard sample which is the same material as the cavity 12.

As with the embodiment of FIG. 5, it is assumed that trim filter has a transmission function T($\lambda$) and the three tristimulus filters have the function $\bar{l}(\lambda)$, $\bar{m}(\lambda)$ and $\bar{n}(\lambda)$, then the filter response may be given by the following formula:

$$R_1 = \int_0^\infty \rho(\lambda) \cdot \bar{l}(\lambda) \cdot I(\lambda) \cdot T(\lambda) \cdot r(\lambda) d\lambda \qquad \text{(iiia)}$$

and a similar response function $RR_l$ may be written for the reference light which has a term MR($\lambda$) for the mirror response and excludes the response of the sample.

$$RR_1 = \int_0^\infty \rho(\lambda) \cdot \bar{l}(\lambda) \cdot I(\lambda) \cdot T(\lambda) \cdot MR(\lambda) d\lambda$$

Similar equations can be written for $RR_m$ and $RR_n$. These functions can be processed electronically in a similar manner as explained hereinbefore to give reference signals $RR_{vl}$ $RR_{vm}$ $RR_{vn}$ corresponding to $R_{vl}$ $R_{vm}$ $R_{vn}$. Again, as described hereinbefore selection of a constant multiplier for each reference signal, $RR_{vl}$, $RR_{vm}$, $RR_{vn}$, such as an electronic gain, allows the amplitude of the reference signals to be calibrated. This is required due to the mirror function $M\rho(\lambda) \neq 1$. The instrument may be calibrated using a standard sample of the same material as the wall of the cavity and adjusting the gain factors $KK_l$ $KK_m$ and $KK_n$ such that the reference and sample signals are equal for each case i.e. $\begin{array}{l} R_{l(cal)} = KK_l RR_l \\ R_{m(cal)} = KK_m \cdot RR_m \\ R_{n(cal)} = KK_n \cdot RR_n \end{array}$ The signals $KK_l$ $RR_l$—may now be used as automatic gain controls for each of the 3 responses. If we define $$R_{l'(cal)} = R_l / KK_l RR_l$$

any variation in the amplitude of the source will not effect the value $R'_{l(cal)}$. Similarly the sensitivity of the detector, overall gain changes, attenuation by dust in the common optical path are all eliminated as variables on the value of $R'_{l(cal)}$.

For any sample $$R_1' = \frac{R_1}{KK_1 \, RR_1}$$

is a response which is similarly stable.

The tristimulus values X Y Z given in equations (i) (i)a and (i)b on page 17 of the disclosure may now be expressed as follows:

$$X = \frac{\int_0^\infty \bar{x}(\lambda) \cdot r(\lambda) \cdot \rho(\lambda) d\lambda}{KK_m \int_0^\infty \bar{y}(\lambda) \cdot \rho(\lambda) MR(\lambda) d\lambda}$$

$$Y = \frac{\int_0^\infty \bar{x}(\lambda) \cdot r(\lambda) \cdot \rho(\lambda) d\lambda}{KK_m \int_0^\infty \bar{y}(\lambda) \cdot \rho(\lambda) MR(\lambda) d\lambda}$$

$$Z = \frac{\int_0^\infty \bar{z}(\lambda) \cdot r(\lambda) \cdot \rho(\lambda) d\lambda}{KK_m \int_0^\infty \bar{y}(\lambda) \cdot \rho(\lambda) MR(\lambda) d\lambda}$$

The equation (xxv) on page 23 of the disclosure may be redefined as $R'_y$ in a similar way to $R'_1$ corresponding to $R_1$, and the tristimulus values may be computed as follows:

$$X = R_{vl}'/R_{vm}'(\text{cal})$$
$$Y = R_{vm}'/R_{vm}'(\text{cal})$$
$$Z = R_{vn}'/R_{vm}'(\text{cal})$$

One of the advantages of this method for the tristimulus values is that the common optical path eliminates variables which could cause inaccuracies, as hereinbefore stated.

A second advantage is that each signal is controlled independently which allows a most significant improvement to be achieved which is a first order elimination of spectral changes in the system due to the source age, detector drift or any other cause.

For example, if the source aged such that the red light increased relative to the green and the blue light decreased relative to the green, giving a tilt to the source output spectral response curve, then the value of $RR_{vl}(\text{cal})$ and $RR_{vn}(\text{cal})$ would also change by a similar proportion relative to $RR_{lm}(\text{cal})$. The tristimulus values having these functions included in their numerator term (electronically as automatic gain controls) would be essentially independent (to a first order) of the spectral change from an initially calibrated source.

$$X = \frac{R_{vl}'}{R_{vm}'(\text{cal})} = \frac{R_{vl}/R_{vl}(\text{cal})}{R_{vm}'(\text{cal})}$$

As stated before, an instrument used for airborne survey would be able to use solar radiation over limited periods of time where spectral changes were small. Although the unit in this case would only approximate the CIE system of units it nevertheless is an accurate measurement tool for subtle changes in terrain colour and has application for research into such areas as crop ripeness and disease. The implementation of three automatic gain controls, to replace the single control Rvr is similar to the electronic processing technique as explained hereinbefore. Periodic switching of the mirror 392 from signal to reference can be achieved by any suitable means such as a rotary solenoid, torque motor or other electro-mechanical device, with a sensor such as a photocell and light emitting device to inform the signal processing of the status 'signal or reference'. A further embodiment of the invention is shown in FIG. 17 and involves the use of more than one set of filter functions on a spatial filter disc giving a "multiple source" filter.

Figure 17:
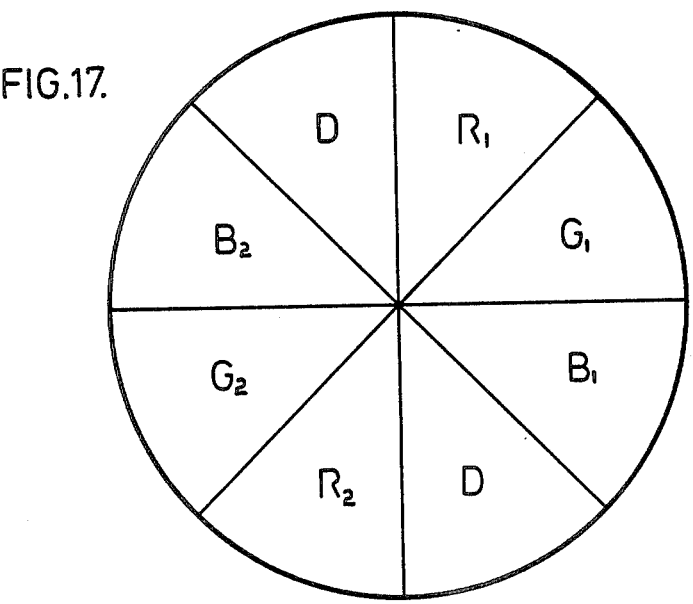
FIG. 17 is a schematic view of a spatial filter disc which produces a multiple source filter.

Referring now to FIG. 17, there is shown a spatial filter disc which gives a multiple source filter. $R_1 G_1 B_1$ are a set of spatial filters for an apparent standard source $S_1$. $R_2 G_2 B_2$ are a set of spatial filters for an apparent standard source $S_2$ and D is the dark space. In this way, a sample can be measured for two different sources and its metameric characteristics be evaluated. The "multiple source" filter requires that the signal processing electronics be shared each half cycle in the case illustrated, increasing the circuitry by by a modest amount, and requiring an extra storage element for simultaneous display or recording of data for both apparent sources.

The embodiments of the invention in which an exclusive property or privilege is claimed are defined as follows:

1. An apparatus for the measurement of colour of a sample which comprises:
   (a) an illumination means for illumination of said sample with light, the sample reflecting a part of said light;
   (b) an electro-optical sensing head to receive the reflected light from said illuminated sample and to output electronic signals, said electro-optical sensing head comprising:
      (i) means for dispersing the reflected light from said sample to form a spectrum,
      (ii) a moving spatial filter to modulate said spectrum in time and space;
      (iii) a marking means to selectively mark the light from the modulated spectrum;
      (iv) means for transmitting pulses of light from said illumination means to a photodetector via a reference optical path to produce reference light pulses, wherein said reference optical path is the same optical path as the optical path from the light from said sample, and
      (v) a photodetector to detect the modulated spectrum and said reference light pulses and to transform said modulated spectrum and said reference light pulses into an electronic signal; and
   (c) an electronic processing unit to process said electronic signals from said electro-optical sensing head.

2. An apparatus as claimed in claim 1 wherein said illumination means is a light source.

3. An apparatus as claimed in claim 2 wherein said light source is the sun.

4. An apparatus as claimed in claim 1 wherein said means for dispersing said reflected light from said sample to form a spectrum includes:
   (a) a collimating lens to receive said light from said slit in said integrating cavity;
   (b) a diffraction grating to diffract said collimated light from said collimating lens,
   (c) a focusing lens to focus said diffracted light to spectrum in a flat, focal plane.

5. An apparatus as claimed in claim 1 wherein said moving spatial filter includes timing marks on a face of said filter and a detection means to detect the timing marks on the face of said filter, and to convert the movement of said timing marks into an electronic signal, said detection means comprising, in combination, a pair of light emitting diodes and a pair of photodetectors to detect the movement of said timing marks.

6. An apparatus as claimed in claim 1 wherein said photodetector includes a condenser lens to condense the spectrum to a detection plane in said photodetector and a detection means in said photodetector to detect said condensed spectrum.

7. An apparatus as claimed in claim 1 wherein said electronic processing unit processes electronic signals into chromatically co-ordinates and tristimulus values for the sample, said unit consisting of:
   (a) an automatic zero loop to eliminate errors due to detector dark current and electronic drift;
   (b) an automatic gain control loop to allow a large dynamic range of light levels to be accepted and to maintain signal voltage levels at higher values than error voltages specified in the electronic components; and
   (c) an automatic means to produce a digital output of tristimulus values X, Y, Z and chromaticity values x,y to the accuracies of the order of ±0.0001 for x,y with half a second response time and 36 watts of incandescent illumination in an integrating cavity.

8. An apparatus as claimed in claim 1 wherein said masking means is a stationary spatial filter.

9. An apparatus as claimed in claim 1 wherein said spatial filter is a multiple source spatial filter.

10. An apparatus as claimed in claim 1 wherein said illumination means comprises a plurality of light sources and supports, said supports supporting said light sources and said sample in an integrating cavity wherein the light from said light sources illuminates said cavity and is reflected from said sample through a slit in said cavity.

* * * * *